United States Patent
Uchino (10) Patent No.: US 10,209,916 B2
(45) Date of Patent: Feb. 19, 2019

(54) DEVICE AND METHOD TO DIVIDE AND DOWNLOAD CONTENT DATA

(71) Applicant: FUJITSU LIMITED, Kawasaki-shi, Kanagawa (JP)

(72) Inventor: Makoto Uchino, Hamura (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/581,886

(22) Filed: Apr. 28, 2017

(65) Prior Publication Data

US 2017/0357464 A1 Dec. 14, 2017

(30) Foreign Application Priority Data

Jun. 10, 2016 (JP) .................................. 2016-116689

(51) Int. Cl.
G06F 3/06 (2006.01)
(52) U.S. Cl.
CPC ............ *G06F 3/0643* (2013.01); *G06F 3/061* (2013.01); *G06F 3/067* (2013.01); *G06F 3/0659* (2013.01); *G06F 3/0673* (2013.01); *G06F 3/0676* (2013.01)
(58) Field of Classification Search
CPC ....... G06F 3/061; G06F 3/0643; G06F 3/0673
USPC .......................................................... 711/154
See application file for complete search history.

(56) References Cited

U.S. PATENT DOCUMENTS

| 2002/0095683 A1* | 7/2002 | Watanabe | H04N 7/17318 725/90 |
| 2007/0067812 A1* | 3/2007 | Watanabe | H04N 7/17318 725/90 |
| 2009/0003592 A1* | 1/2009 | Hanai | H04N 7/1675 380/29 |
| 2012/0246269 A1* | 9/2012 | Ishihara | G06F 17/30899 709/217 |

FOREIGN PATENT DOCUMENTS

| JP | 2008-262452 | 10/2008 |
| JP | 2010-198368 | 9/2010 |
| JP | 2011-034131 | 2/2011 |
| WO | 2009/142059 | 11/2009 |

* cited by examiner

Primary Examiner — Than Nguyen
(74) Attorney, Agent, or Firm — Westerman, Hattori, Daniels & Adrian, LLP (57) ABSTRACT

A data write control device includes: a memory that stores a data write control program and data; and a processor that executes the data write control program, wherein the processor: divides data to be downloaded into pieces of divided data; downloads the pieces of divided data; and performs, based on a file system of a storage that is a storage destination to store the data to be downloaded, a first write process of sequentially writing the pieces of divided data into the storage, or a second write process of writing all of the pieces of divided data into the storage at once after all of the pieces of divided data are downloaded.

12 Claims, 7 Drawing Sheets

DEVICE AND METHOD TO DIVIDE AND DOWNLOAD CONTENT DATA

CROSS-REFERENCE TO RELATED APPLICATION

This application is based upon and claims the benefit of priority of the prior Japanese Patent Application No. 2016-116689, filed on Jun. 10, 2016, the entire contents of which are incorporated herein by reference.

FIELD

The embodiment discussed herein is related to a data write control device, a data write control method, and a non-transitory computer-readable recording medium recording a data write control program.

BACKGROUND

In the field of wireless communications, limited radio resources between a mobile station and a base station are efficiently used.

Related art is disclosed in International Publication Pamphlet No. WO 2009/142059, Japanese Laid-open Patent Publication No. 2011-34131, Japanese Laid-open Patent Publication No. 2010-198368, or Japanese Laid-open Patent Publication No. 2008-262452.

SUMMARY

According to an aspect of the embodiments, a data write control device includes: a memory that stores a data write control program and data; and a processor that executes the data write control program, wherein the processor: divides data to be downloaded into pieces of divided data; downloads the pieces of divided data; and performs, based on a file system of a storage that is a storage destination to store the data to be downloaded, a first write process of sequentially writing the pieces of divided data into the storage, or a second write process of writing all of the pieces of divided data into the storage at once after all of the pieces of divided data are downloaded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, a division download system is provided in which one piece of content is divided into pieces of data and then the pieces of data are simultaneously downloaded. In the division download system, pieces of divided data are simultaneously downloaded, and thus communication resources between a mobile station and a base station are efficiently used. In comparison with a system in which data is downloaded without the data being divided, high-speed data communication is performed.

For example, in the case where downloaded data is written and stored into a storage, a write time period may increase according to different file systems of storages. Thus, a total download time period taken to complete storage into the storage may increase in comparison with that in the case where data is not divided.

For example, in the division download system, downloads of pieces of divided data into which one piece of content is divided are completed in random order. In the case where the pieces of downloaded data are sequentially written into the storage, data writes are performed via random access. At this time, in the case where a file system of the storage is a file allocation table (FAT) system (hereinafter referred to as a FAT), overhead processing in which a write position is determined is performed during random access. For this reason, in the case where the file system of the storage is the FAT, a write time period may increase in comparison with those in other file systems, such as an NT file system (NTFS) and a second extended file system (ext2).

For example, there may be provided a data write control device that reduces a write time period taken to write downloaded data into a storage.

In the following figures, components having the same functions or similar functions are denoted by the same reference numerals, and repeated descriptions thereof may be omitted.

Figure 1:
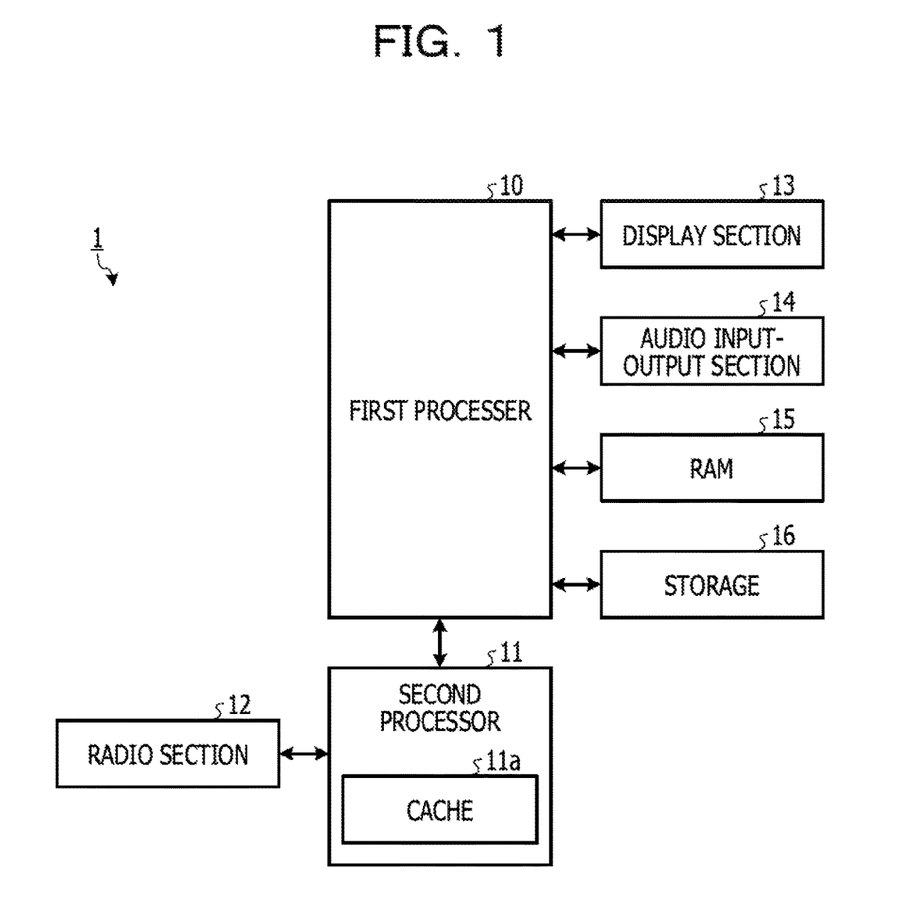
FIG. 1 illustrates an example of a hardware configuration of a terminal device.

FIG. 1 illustrates an example of a hardware configuration of a terminal device. As illustrated in FIG. 1, a terminal device 1 includes a first processor 10, a second processor 11, a radio section 12, a display section 13, an audio input-output section 14, a random access memory (RAM) 15, and a storage 16. The terminal device 1 may be a smartphone or a tablet terminal, for example, and may be an example of a data write control device. The terminal device 1 may include, in addition to hardware illustrated in FIG. 1, various devices, such as various input devices, included in existing computers.

Figure 2:
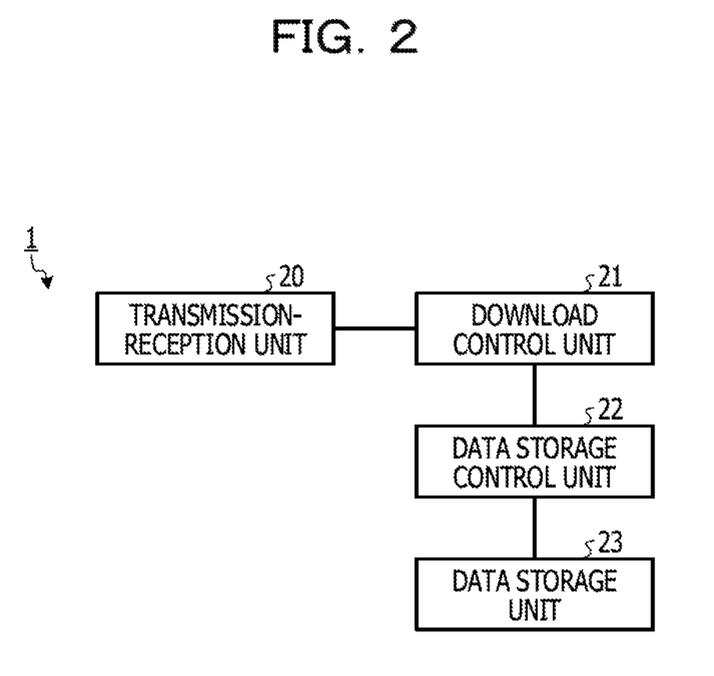
FIG. 2 illustrates an example of a functional configuration of the terminal device.

The first processor 10 is a processing section that controls processes performed by the entire terminal device 1, and the first processor 10 reads a program from the storage 16 to execute a process. For example, when the first processor 10 executes a process, functions illustrated in FIG. 2 are implemented, and processes illustrated in FIG. 3 and subsequent figures are executed.

The second processor 11 is a processing section that controls processes involved in wireless communication in the radio section 12 under the control of the first processor 10. The second processor 11 includes a cache 11a that temporarily stores, for example, data downloaded via wireless communication in the radio section 12.

The radio section 12 wirelessly communicates with another mobile device or a base station device by using an antenna under the control of the second processor 11. For example, the radio section 12 wirelessly communicates with another mobile device or a base station device by using a communication system, such as long term evolution (LTE) communication or wireless fidelity (WiFi) (registered trademark) communication. The radio section 12 may perform communication via a communications carrier using LTE communication, or may simultaneously implement a plurality of communication systems to increase a communication speed involved in wireless communication.

The display section 13 may be a liquid crystal display or the like and displays various pieces of information under the control of the first processor 10. The audio input-output section 14 outputs, from a speaker, sound input from the first processor 10. The audio input-output section 14 collects sound from a microphone and outputs it to the first processor 10.

The RAM 15 provides a work area used when the first processor 10 executes a program. The RAM 15 stores, for example, a processing result generated based on a program or the like executed by the first processor 10, and various pieces of information before being stored into the storage 16.

The storage 16 is a storage device, such as a memory card or hard disk. In the storage 16, any file system of various file systems is applied. A file system applied in the storage 16 may be any of FAT, NTFS, ext2, ext3, and ext4, for example. A plurality of storages 16 may be coupled to the terminal device 1, and different file systems may be applied in the respective storages 16. In the storage 16, a different file system may be applied for each partition obtained by logically partitioning the storage 16.

FIG. 2 illustrates an example of a functional configuration of the terminal device. As illustrated in FIG. 2, the terminal device 1 includes a transmission-reception unit 20, a download control unit 21, a data storage control unit 22, and a data storage unit 23. Each of these functions is implemented by processes executed by the first processor 10 and the second processor 11. Between functions, input and output of a signal or data are performed unidirectionally or bidirectionally, for example.

The transmission-reception unit 20 transmits and receives data via the radio section 12. For example, under the control of the download control unit 21, the transmission-reception unit 20 downloads data from another device coupled thereto via wireless communication using the radio section 12, for example, from a server device on a communication network, such as the Internet. Download of data in the transmission-reception unit 20 includes division download and normal download.

In division download, content data (hereinafter referred to as data) to be downloaded is divided into pieces of data, and the pieces of data are downloaded in parallel. For example, pieces of data into which content data is divided (hereinafter referred to as pieces of divided data) are downloaded by a plurality of threads in parallel. For example, in division download, discrete data positions of data to be downloaded are set as download starting positions of respective threads, and the threads perform respective downloads in parallel.

In normal download, data to be downloaded is downloaded from a lead position sequentially by a single thread. Under the control of the download control unit 21, the transmission-reception unit 20 downloads data to be downloaded via normal download or division download.

In the case where the transmission-reception unit 20 partitions large volumes of data from the beginning into segments to download the segments, the transmission-reception unit 20 may perform division download or normal download for each partitioned segment. For example, division download or normal download of data of one file to be downloaded may be performed. For example, division download or normal download may be performed for each of a plurality of segments into which one file is partitioned. For example, in the case where a 100 Mbytes of file is downloaded, the file may be partitioned every 10 Mbytes from the beginning into segments, and division download or normal download may be performed for each segment.

The download control unit 21 controls execution of a download operation performed in the transmission-reception unit 20. For example, the download control unit 21 causes the transmission-reception unit 20 to perform division download or normal download of data to be downloaded. The division download or normal download may be performed in accordance with, for example, a setting set by a user. For example, the download control unit 21 may perform division download.

The data storage control unit 22 controls, based on a file system of the storage 16 that is a storage destination to store data to be downloaded, storage of data downloaded under the control of the download control unit 21 into the storage 16.

For example, in the case where a file system of the storage 16 that is a storage destination is a specific file system, such as the FAT, the data storage control unit 22 downloads all pieces of divided data corresponding to data to be downloaded and then writes all the pieces of divided data into the storage 16 at once. For example, the data storage control unit 22 writes all pieces of divided data corresponding to data to be downloaded stored in the RAM 15 into the storage 16 at once via sequential access.

In the case where the file system of the storage 16 that is a storage destination is a file system other than the specific file system, such as the FAT, the data storage control unit 22 sequentially writes pieces of divided data downloaded via division download into the storage 16. For example, the data storage control unit 22 sequentially writes, via random access, pieces of divided data stored in the cache 11*a* into the storage 16 in the order in which the download of the pieces of divided data via division download has completed.

The data storage unit 23 stores data into the storage 16 under the control of the data storage control unit 22. For example, under the control of the data storage control unit 22, the data storage unit 23 reads data stored in the cache 11*a* and the RAM 15 and writes the data into the storage 16 via sequential access or random access.

Figure 3:
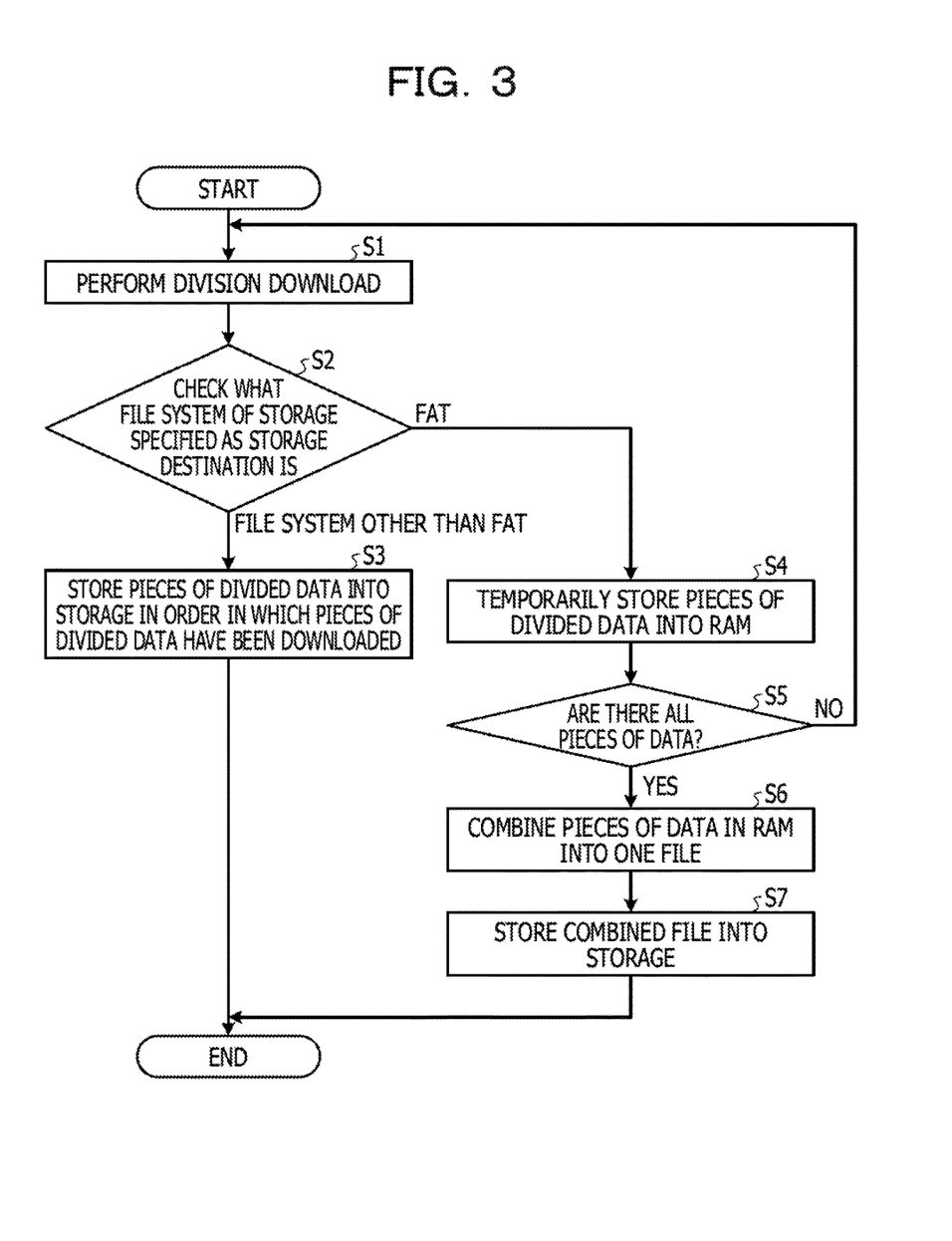
FIG. 3 illustrates an example of an operation performed by the terminal device.

FIG. 3 illustrates an example of an operation performed by the terminal device. When a process is started based on an instruction or the like from the user, the download control unit 21 starts division download of specified data to be downloaded (file) (S1).

In advance of download, the user may specify data to be downloaded (file) and the storage 16 that stores downloaded data. For example, in the case where there are a plurality of storages 16, the user may specify a storage 16 that is a storage destination. In the case where the storage 16 that is a storage destination is partitioned into a plurality of partitions, the user may specify a partition that serves as a storage destination.

After pieces of divided data downloaded by the transmission-reception unit 20 via division download are temporarily stored in the cache 11*a*, the pieces of divided data are sequentially stored into a work area or the like provided in the RAM 15. For example, the cache 11*a* and the RAM 15 may function as a storage section that stores the pieces of divided data downloaded via division download before the pieces of divided data are stored into the storage 16.

The data storage control unit 22 checks a file system of the storage 16 specified as a storage destination to determine whether the file system is the specific file system (S2). For example, the data storage control unit 22 determines whether the file system of the storage 16 specified as a storage destination is the FAT.

When the file system is a file system other than the FAT in S2, the data storage control unit 22 performs control to store (write) pieces of divided data downloaded via division download and temporarily stored in the cache 11a into the storage 16 in the order in which the pieces of divided data have been downloaded (S3). In S3, downloads of the pieces of divided data have been completed in random order, and thus the data storage unit 23 writes the pieces of divided data via random access.

When the file system is the FAT in S2, the data storage control unit 22 temporarily stores pieces of divided data downloaded via division download and temporarily stored in the cache 11a into the RAM 15 (S4). The data storage control unit 22 determines whether there are all pieces of data corresponding to the data to be downloaded, for example, whether all pieces of divided data have been downloaded and stored into the RAM 15 (S5).

When there are not all pieces of data (NO in S5), the process returns to S1. The data storage control unit 22 continues division download until all pieces of data corresponding to the data to be downloaded are downloaded and stored into the RAM 15.

When there are all pieces of data (YES in S5), the data storage control unit 22 combines the pieces of divided data in the RAM 15 into one file (content data) with reference to a header or the like indicating what number divided data each piece of data is (S6). The data storage control unit 22 performs control to store (write) the combined file into the storage 16 (S7). In S7, there are all the pieces of data of the file that is the data to be downloaded (content data) and that is to be stored into the storage 16, and thus the data storage unit 23 writes the file from the beginning to the end sequentially via sequential access.

Figure 4:
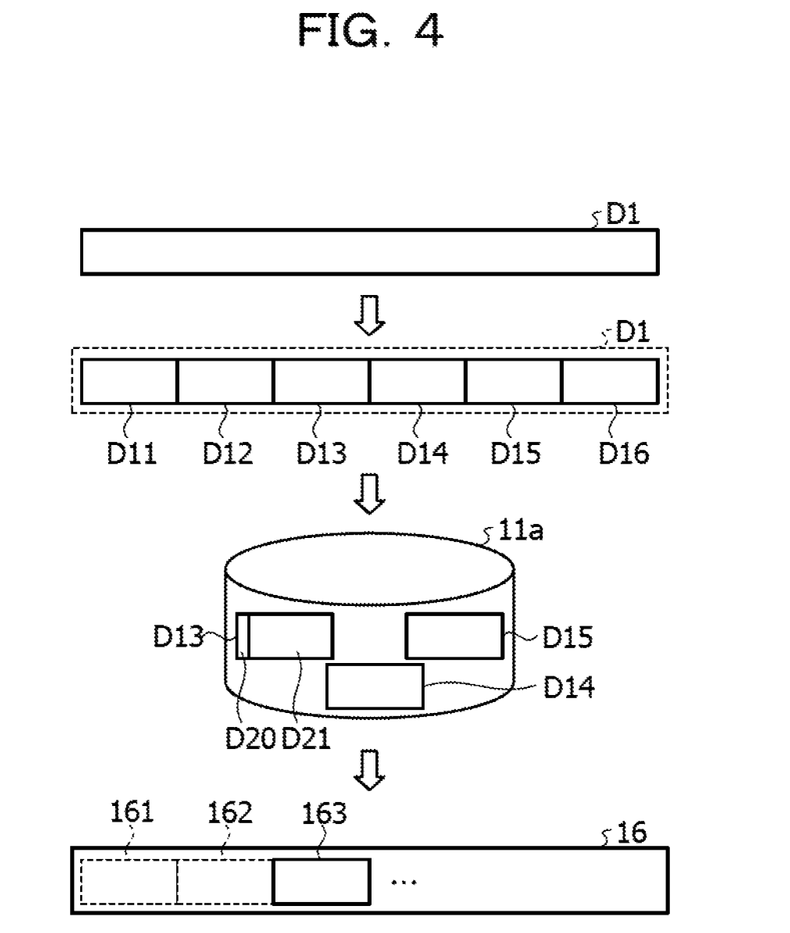
FIG. 4 illustrates an example of a write into a storage via random access.

FIG. 4 illustrates an example of a write into the storage via random access. As illustrated in FIG. 4, in the case where pieces of divided data D11 to D16 of data D1 to be downloaded are downloaded via division download and stored into the storage 16 in the order in which the pieces of divided data D11 to D16 have been downloaded, writes are performed via random access.

For example, in FIG. 4, the pieces of divided data D13, D14, and D15 have been downloaded and stored in the cache 11a before downloads of the pieces of divided data D11 and D12 are completed. Thus, in the case where the divided data D13 is written into the storage 16 via random access, it is checked what number data the divided data D13 is by using a header D20 included in the divided data D13, and overhead processing in which a write position of a data body D21 of the divided data D13 is determined is performed. For example, in overhead processing performed when the divided data D13 is written, pieces of provisional data are stored into regions 161 and 162 for storing the pieces of divided data D11 and D12, and a position of a region 163 for storing the divided data D13 is determined. Likewise, in the case where the pieces of divided data D14 and D15 are written via random access, overhead processing in which a write position is determined is performed, and then a write into the storage 16 is performed.

In some file systems (for example, the FAT and the like), it may take time to perform overhead processing in which a write position is determined. Thus, in the specific file system, it may take time to perform a write via random access.

Figure 5:
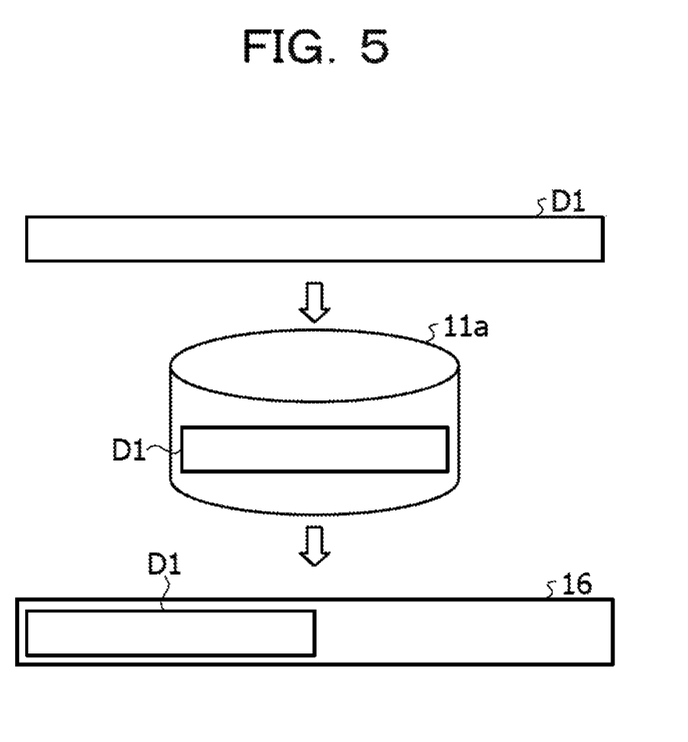
FIG. 5 illustrates an example of a write into the storage via sequential access.

FIG. 5 illustrates an example of a write into the storage via sequential access. In sequential access, downloaded data D1 is written into an empty region of the storage 16 from the beginning sequentially. In a write via sequential access, overhead processing in which a write position is determined for each piece of divided data is not included. For this reason, in sequential access, a write time period does not increase even in a file system in which a write time period increases in random access.

Figure 6:
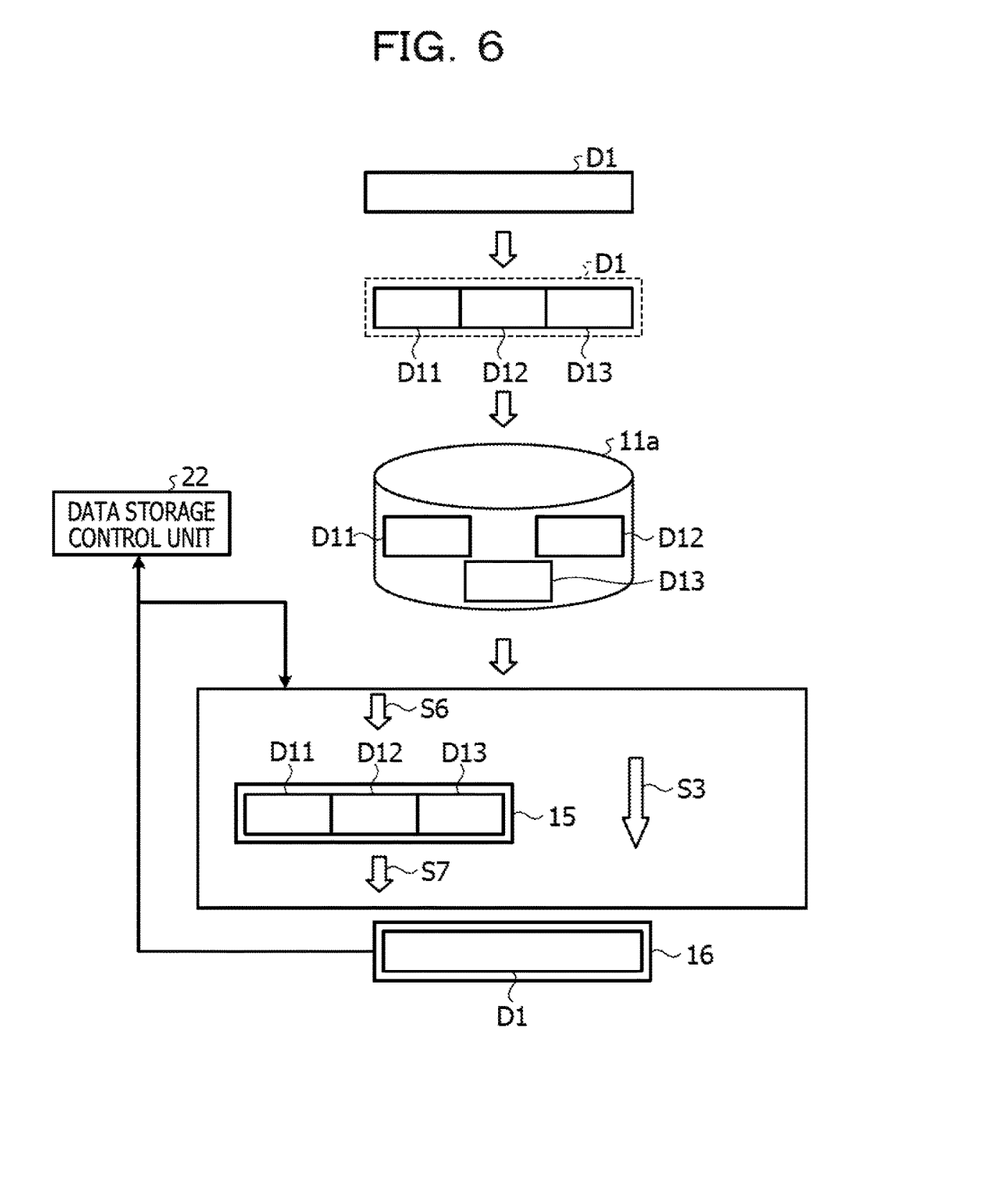
FIG. 6 illustrates an example of a write performed by the terminal device.

FIG. 6 illustrates an example of a write performed by the terminal device. As illustrated in FIG. 6, based on a file system of the storage 16 that serves as a storage destination to store data D1 to be downloaded, for example, in the case where the file system of the storage 16 is a file system other than the FAT, the data storage control unit 22 of the terminal device 1 sequentially writes pieces of divided data D11 to D13 into the storage 16 (S3). For example, in the case where the file system of the storage 16 is the FAT, the data storage control unit 22 downloads all of the pieces of divided data D11 to D13 corresponding to the data D1 to be downloaded (S6) and then writes the pieces of divided data D11 to D13 into the storage 16 at once (S7).

For this reason, in the terminal device 1, in the case where the data D1 to be downloaded is downloaded via division download and stored into the storage 16, a write time period may not increase even when the file system of the storage 16 is the specific file system (for example, the FAT) in which a write time period increases in random access.

Figure 7:
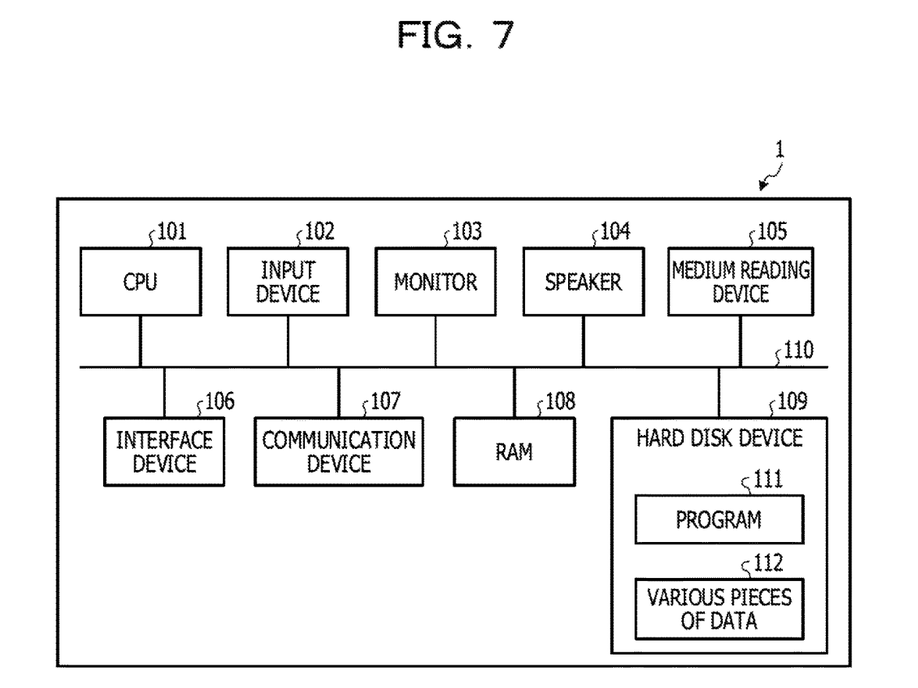
FIG. 7 illustrates an example of a hardware configuration of the terminal device.

All or some components of each device illustrated in FIGS. 1, 2, and 7 may be functionally or physically distributed or integrated in any unit in accordance with various loads, usage states, or the like.

All or some of various processing functions performed by the terminal device 1 may be executed on a central processing unit (CPU) (or a microcomputer, such as a micro processing unit (MPU) or micro controller unit (MCU)). All or some of the various processing functions may be executed on a program to be analyzed and executed by the CPU (or a microcomputer, such as the MPU or MCU), or on hardware using wired logic. Additionally, the various processing functions performed by the terminal device 1 may be executed, based on cloud computing, by causing a plurality of computers to work cooperatively with each other.

The above-described various processes may be implemented by causing a computer, such as a personal computer, other than a terminal device, such as a smartphone or tablet terminal, to execute a program prepared in advance. FIG. 7 illustrates an example of a hardware configuration of the terminal device.

As illustrated in FIG. 7, the terminal device 1 includes a CPU 101 that executes various types of arithmetic processing, an input device 102 that receives a data input, a monitor 103, and a speaker 104. The terminal device 1 includes a medium reading device 105 that reads a program or the like from a storage medium, an interface device 106 that establishes connection with various devices, and a communication device 107 that establishes wired or wireless communication connection with an external device. The terminal device 1 includes a RAM 108 that temporarily stores various pieces of information, and a hard disk device 109. Each of the components (101 to 109) of the terminal device 1 is coupled to a bus 110.

In the hard disk device 109, a program 111 for executing the various processes performed by the transmission-reception unit 20, the download control unit 21, the data storage control unit 22, and the data storage unit 23, which are described above, is stored. In the hard disk device 109, various pieces of data 112, such as pieces of divided data downloaded via division download, that are referred to by the program 111 are stored. The input device 102 receives, for example, an input about operation information from an operator of the terminal device 1. The monitor 103 displays, for example, various types of screens operated by the operator. To the interface device 106, for example, a printing device or the like is coupled. The communication device 107 is coupled to a communication network, such as a local area network (LAN), and exchanges various pieces of information with an external device via the communication network.

The CPU 101 performs the various processes by reading the program 111 stored in the hard disk device 109, loading the program 111 into the RAM 108 and executing the program 111. For example, the program 111 may be stored in the hard disk device 109, or may be read from a storage medium readable by the terminal device 1. Examples of a storage medium readable by the terminal device 1 include portable recording media, such as a compact disc read-only memory (CD-ROM), a digital versatile disc (DVD), and a Universal Serial Bus (USB) memory, a semiconductor memory, such as a flash memory, and a hard disk drive. A device connected to a public network, the Internet, a LAN, or the like may store the program 111, and the terminal device 1 may read the program 111 via the public network, the Internet, the LAN, or the like to execute the program 111.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A terminal device comprising:
   a memory that stores a data write control program and data; and
   a processor that executes the data write control program, wherein the processor:
   divides data to be downloaded into pieces of divided data;
   downloads the pieces of divided data;
   stores the pieces of divided data in the memory;
   when a file system of a storage that is a storage destination to store the data to be downloaded is a file system other than a file allocation table (FAT) system, performs a first write process of writing the pieces of divided data into the storage in an order in which the pieces of divided data are downloaded; and
   when the file system is the file allocation table (FAT) system, performs a second write process of writing all of the pieces of divided data into the storage at once after all of the pieces of divided data are downloaded.

2. The terminal device according to claim 1,
   wherein the processor performs the first write process via random access to the storage.

3. The terminal device according to claim 1,
   wherein the processor performs the second write process via sequential access to the storage.

4. The terminal device according to claim 1,
   wherein the data to be downloaded is data regarding one file to be downloaded.

5. A control method executed by a terminal device, comprising:
   dividing data to be downloaded into pieces of divided data;
   downloading the pieces of divided data;
   storing the pieces of divided data;
   when a file system of a storage that is a storage destination to store the data to be downloaded is a file system other than a file allocation table (FAT) system, performing a first write process of writing the pieces of divided data into the storage in an order in which the pieces of divided data are downloaded; and
   when the file system is the file allocation table (FAT) system, performing a second write process of writing all of the pieces of divided data into the storage at once after all of the pieces of divided data are downloaded.

6. The control method executed by the terminal device according to claim 5,
   wherein the first write process is performed via random access to the storage.

7. The control method executed by the terminal device according to claim 5,
   wherein the second write process is performed via sequential access to the storage.

8. The control method executed by the terminal device according to claim 5,
   wherein the data to be downloaded is data regarding one file to be downloaded.

9. A non-transitory computer-readable recording medium recording a data write control program which causes a terminal device to perform a process, the process comprising:
   dividing data to be downloaded into pieces of divided data;
   downloading the pieces of divided data;
   storing the pieces of divided data;
   when a file system of a storage that is a storage destination to store the data to be downloaded is a file system other than a file allocation table (FAT) system, performing a first write process of writing the pieces of divided data into the storage in an order in which the pieces of divided data are downloaded; and
   when the file system is the file allocation table (FAT) system, performing a second write process of writing all of the pieces of divided data into the storage at once after all of the pieces of divided data are downloaded.

10. The non-transitory computer-readable recording medium according to claim 9,
    wherein the first write process is performed via random access to the storage.

11. The non-transitory computer-readable recording medium according to claim 9,
    wherein the second write process is performed via sequential access to the storage.

12. The non-transitory computer-readable recording medium according to claim 9,
    wherein the data to be downloaded is data regarding one file to be downloaded.

* * * * *